United States Patent
Yamashita et al.

(10) Patent No.: US 6,455,791 B1
(45) Date of Patent: Sep. 24, 2002

(54) ACCELERATION DETECTION DEVICE AND SENSITIVITY SETTING METHOD

(75) Inventors: Toshiyuki Yamashita; Eiichiro Murai, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/931,046

(22) Filed: Aug. 17, 2001

Related U.S. Application Data

(63) Continuation of application No. PCT/JP99/07163, filed on Dec. 21, 1999.

(51) Int. Cl.[7] ............................................... H01H 35/14
(52) U.S. Cl. .................................................... 200/61.53
(58) Field of Search ................... 200/61.4 R, 61.45 M, 200/61.47, 61.48, 61.44, 61.5, 61.51, 61.52, 61.53

(56) References Cited

U.S. PATENT DOCUMENTS 5,801,348 A    9/1998    Asada ..................... 200/61.53

FOREIGN PATENT DOCUMENTS

| JP | 5-250969 | 9/1993 | |
| JP | 6-349390 | 12/1994 | |
| JP | 7-040803 | 2/1995 | |
| JP | 9-072931 | 3/1997 | |
| JP | 9-211023 | 8/1997 | |
| WO | WO 01/46702 A1 * | 6/2001 | ......... G01P/15/135 |

* cited by examiner

*Primary Examiner*—J. R. Scott
(74) *Attorney, Agent, or Firm*—Sughrue Mion, PLLC

(57) ABSTRACT

The setting of a sensitivity of an acceleration detection device is performed by regulating the characteristics of a compression coil spring such as an initial load or a spring constant of the compression coil spring and by regulating the dimension of a mass body in an axial direction of a slide shaft. Further, a compression coil spring is used which has non-linear deflection-load characteristics.

8 Claims, 6 Drawing Sheets

US 6,455,791 B1

ACCELERATION DETECTION DEVICE AND SENSITIVITY SETTING METHOD

CROSS-REFERENCE TO THE RELATED APPLICATION

This Application is a continuation of International Application No. PCT/JP99/07163, whose International filing date is Dec. 21, 1999, the disclosures of which Application are incorporated by reference herein. The PCT application was published in Japanese on Jun. 28, 2001 WO 01/46702 A1.

BACKGROUND OF THE INVENTION

1. Field of the Invention

The present invention relates to an acceleration detection device which detects acceleration of a moving body such as an automobile and sensitivity setting method therefor. In particular, the present invention relates to an acceleration detection device and sensitivity setting method therefor, which is used with a collision detection device which detects acceleration generated in the moving body during a collision and outputs an electric signal to an airbag activation device to operate an air bag.

2. Description of the Prior Art

FIG. 1 is a perspective view of a conventional acceleration detection device as shown in JP-A-9-211023 and shows the device with a part of a housing removed. FIG. 2 is a sectional view of the acceleration detection device as shown in FIG. 1. In the figures, reference numeral 1 denotes a mass body having a predetermined mass and being constituted by a first mass member 2 and a second mass member 4. 3 is a moving contact which displaces with the mass body 1. 5 is a slide shaft which passes through the mass body 1 to limit the moving direction of the mass body 1 and slidably supports the mass body 1. 6 is a cylindrical compression coil spring which presses the mass body 1 in a predetermined direction (indicated by arrow A in FIG. 1). 7, 8 are fixed contacts which are arranged on an inner face of the housing 9 so as to be faced with each other and sandwich the slide shaft 5, and which come into contact with the moving contact 3 when the mass body 1 is displaced at a fixed distance in an opposite direction to the above predetermined direction along the slide shaft 5 against the elastic force of the compression coil spring 6. 9 is a housing which stores the mass body 1, the moving contact 3, the slide shaft 5 and the compression coil spring 6. 10 is a cover which constitutes a case of the acceleration detection device by assembly with the housing 9. One end of the compression coil spring 6 abuts with the mass body 1 and the other end abuts with the housing 9. The cylindrical compression coil spring 6 has linear deflection-load characteristics in which a degree of deflection (the degree of displacement of the mass body 1) is proportional to a load applied to the compression coil spring 6.

The moving contact 3 is provided with two contacts 3a and positioning nails 3b. The moving contact 3 is sandwiched between the first mass member 2 and the second mass member 4 and is fixed to the mass body 1. The tip portion of the contact 3a is formed in the shape of a letter R. The respective contacts 3a are formed in a straight cantilever with respect to the mass body 1. The positioning nails 3b abut with the second mass member 4, thereby to position the moving contact 3 and prevent rotation thereof.

The housing 9 is provided with a notch 9a for housing the contacts 3a of the moving contact 3 when not in contact with the fixed contacts 7, 8, a coil spring fixing portion 9b for fixing an end of the compression coil spring 6, a stopper 9c for limiting the displacement of the mass body 1, and a rotation stopper 9d for preventing the mass body 1 from rotating about the slide shaft 5.

The first mass member 2 is provided with shock absorbing members 2a for absorbing the shock upon collision with the stopper 9c of the housing 9, a tapered portion 2b for guiding the compression coil spring 6 when the first mass member 2 is coupled with the compression coil spring 6 and acting as a seat surface when joined, and a base 2c on which the shock absorbing members 2a and the tapered portion 2b are mounted. The shock absorbing member 2a is of a rubber-like material having a large shock absorbing capacity, for example, a thermoplastic elastomer and the shock absorbing member 2a is fixed to the base 2c by rotating from front to back through a hole provided in the base 2c or by burning onto the base 2c.

The second mass member 4 is provided with a plate portion 4a which has a square cross section and limits the rotation of the mass body 1 by abutting with the rotation stopper 9d of the housing 9, and a positioning portion 4b which abuts with the positioning nail 3b of the moving contact 3.

In this type of acceleration detection device, an electric current flows between the fixed contacts 7, 8 when the moving contact 3 is in contact with the fixed contacts 7, 8. In this way, it is possible to detect whether acceleration exceeds a predetermined value.

Furthermore, in this type of acceleration detection device, the sensitivity corresponding to a threshold value of a detectable acceleration is determined based on a spring constant of the compression coil spring 6, an initial load which is a load applied to the compression coil spring 6 by the mass body 1 in an unloaded condition in which acceleration is not generated, the distance between the moving contacts 3 and the fixed contacts 7, 8 in the unloaded condition, and the mass of the mass body 1. The sensitivity of the acceleration detection device is set by regulating the pitch and/or the wire radius of the compression coil spring 6, thereby regulating the spring constant and/or the initial load.

The operation of the conventional acceleration detection device when provided in a moving body such as an automobile will be described below.

When a moving body such as an automobile is running normally in an unloaded condition, the mass body 1 is urged towards the cover 10 by the elastic force of the compression coil spring 6. As a result, the contacts 3a of the moving contact 3 are separated from the fixed contacts 7, 8, and does not make a contact with the fixed contacts 7, 8. Thus, an electrical connection does not exist between the moving contact 3 and the fixed contacts 7, 8. Therefore, the fixed contacts 7, 8 are not electrically connected to each other and an electric current does not flow between them. This displays the fact that the moving body such as an automobile is traveling normally and has not undergone a collision.

When the moving body such as an automobile undergoes a collision and an acceleration (deceleration) is generated to the moving body, the mass body 1 slidably supported is displaced towards the stopper 9c against the elastic force of the compression coil spring 6. At this time, the contacts 3a of the moving contact 3 come into contact with the fixed contacts 7, 8 and slides in such a state. As a result, a continuous electrical connection exists between the fixed contacts 7, 8 and the moving contact 3. Thus, when the moving body such as an automobile collides and an acceleration is generated to the moving body, the fixed contacts 7, 8 are electrically connected to each other and a current flows between them. This displays the fact that the moving body such as an automobile has undergone a collision.

Furthermore, when the moving body such as an automobile undergoes a strong collision and a large acceleration is generated as a result, the mass body 1 displaces to a position of the stopper 9c against the elastic force of the compression coil spring 6 and collides with the stopper 9c. As a result, the moving contact 3 vibrates, or the fixed contact 7 vibrates by transmission of the shock wave to the fixed contact 7. Thus, the contact of the moving contact 3 with the fixed contacts 7 is momentarily released by the vibration and a so-called chattering is caused. The influence of the chattering is particularly conspicuous in the acceleration detection device as shown in FIG. 1 in which the moving contact 3 is fixed to the mass body 1. In order to avoid the influence of the chattering, the shock absorbing member 2a is provided on the first mass member 2. In such a way, the collision energy generated by the collision of the mass body 1 with the stopper 9c can be damped and thus the chattering is not caused.

JP-A-9-211023 discloses the provision of a shock absorbing member made of a thermoplastic elastomer on a section of the stopper 9c. In this case, the shock absorbing member absorbs and damps the collision energy generated by the collision of the mass body 1 with the collision absorbing member when the moving body such as an automobile undergoes a strong collision. Thus, it is possible to suppress a rapid rebound of the mass body 1 in an opposite direction. Therefore, the chattering is suppressed.

In the conventional example of the acceleration detection device above, since a cylindrical compression coil spring 6 having linear deflection-load characteristics that the degree of deflection is varied proportional to load is used as an elastic member, it is necessary to provide a shock absorbing mechanism such as a shock absorbing member 2a or a collision buffer which complicates the structure of the device. As a result, the problem of increased manufacturing costs has resulted.

Further, in the conventional acceleration detection device, it is sometimes required to increase the wire radius of the compression coil spring 6 in order to reduce the setting sensitivity. Thus, the total compressed length which is the length of the compression coil spring under a critical compressive load is lengthened and the displacement distance of the mass body 1 is reduced. As a result, when a large acceleration is generated, the problems have arisen that it is not possible to secure a sufficient current carrying time between the fixed contacts 7, 8 or that it is not possible to downsize the device while securing a current carrying time at a certain level between the fixed contacts 7, 8.

Furthermore, in the conventional acceleration detection device, the setting of the sensitivity is performed by regulating the initial load and/or the spring constant of the compression coil spring 6. However, the problem has arisen that the range of sensitivities to be set is narrow and it is not possible to set the sensitivity in a wide range.

SUMMARY OF THE INVENTION

The present invention is proposed to solve the above problems and has the object of providing an acceleration detection device which can be manufactured at a low cost without the need for the provision of a shock absorbing mechanism.

The present invention has the further object of providing an acceleration detection device which can secure a sufficient current carrying time between the fixed contacts when a large acceleration is generated.

The present invention has the further object of providing a downsized acceleration detection device which can secure a current carrying time at a certain level between the fixed contacts when a large acceleration is generated.

The present invention has the further object of providing a sensitivity setting method for an acceleration detection device which can set the sensitivity in a wide range.

As an example of related art to the present application, the lead switch type of acceleration detection device is disclosed in JP-A-6-349390. FIG. 3 is a cross sectional view of the conventional lead switch type acceleration detection device as disclosed in JP-A-6-349390 and shows the device in an unloaded condition. FIG. 4 is a lateral view of a compression coil spring used in the acceleration detection device shown in FIG. 3. In the figures, 101 denotes a housing, 102 is a ring magnet arranged in an outer peripheral portion of the housing 101 to displace freely. 103 is a compression coil spring which is arranged in the outer peripheral portion of the housing 101 and which urges the ring magnet 102 in one direction (indicated by arrow B in FIG. 3) in an unloaded condition. The compression coil spring 103 is formed with an unequal pitch. 104 is a lead switch arranged in a central portion of the housing 101. 105a, 105b denote a contact of the lead switch 104. The compression coil spring 103, which is formed with an unequal pitch, has non-linear deflection-load characteristics.

The operation of the lead switch type of the conventional acceleration detection device arranged on a moving body such as an automobile will be described below.

In an unloaded condition where a moving body such as an automobile is running normally, the ring magnet 102 is pressed to an inner wall of the housing 101 by the elastic force of the compression coil spring 103. As a result, the ring magnet 102 is separated from the lead switch 104, the magnetiting force due to the ring magnet 102 does not magnetically affect the lead switch 104. Thus, the contacts 105a, 105b of the lead switch 104 are in an open state. This displays the fact that the moving body such as an automobile is traveling normally and has not undergone a collision.

When the moving body such as an automobile experiences a collision and an acceleration (deceleration) is generated as a result, the ring magnet 102 arranged in the outer peripheral portion of the housing 101 so as to displace freely is displaced against the elastic force of the compression coil spring 6. At this time, the contacts 105a, 105b of the lead switch 104 are in a closed state. Thus, this displays the fact that the moving body such as an automobile has undergone a collision.

Furthermore, when the moving body such as an automobile experiences a large collision and a large acceleration is generated as a result, the ring magnet 102 collides with the inner wall of the housing 102. At this time, the elastic force of the compression coil spring 103 is increased near the inner wall of the housing 101 and the speed at which the ring magnet 102 collides with the inner wall of the housing 101 is reduced, since the compression coil spring 103 has non-linear deflection-load characteristics.

In JP-A-6-349390, apart from a compression coil spring 103 formed with an unequal pitch as above, a compression coil spring formed to vary a wire radius at a central position, a compression coil spring formed in a drum shape and a compression coil spring formed in a conical shape are disclosed. All of the compression coil springs have the non-linear deflection-load characteristics.

According to the present invention, there is provided a method of setting a sensitivity for an acceleration detection device, the acceleration detection device including a mass body having a predetermined mass, a shaft for limiting a direction of displacement of the mass body, an elastic member for urging the mass body in a predetermined direction, and a switch which is turned on when the mass body is displaced by a fixed distance in an opposite direction to the predetermined direction along the shaft against an elastic force of the elastic member, the method comprising the step of setting a sensitivity of the acceleration detection device by regulating characteristics of the elastic member and by regulating dimension of the mass body with respect to an axial direction of the shaft.

In such a way, it is possible to obtain a method for setting a sensitivity of an acceleration detection device in which the sensitivity can be set in a wide range.

Further, according to the present invention, there is provided a method of setting a sensitivity for an acceleration detection device, the acceleration detection device including a mass body having a predetermined mass, a moving contact fixed to the mass body and displaced with the mass body, a slide shaft for limiting a direction of displacement of the mass body and slidably supporting the mass body, an elastic member for urging the mass body in a predetermined direction, a container for housing the mass body, the moving contact, the slide shaft and the elastic member, and fixed contacts disposed on an inner surface of the container to face with each other and to sandwich the slide shaft, the fixed contacts contacting with the moving contact when the mass body is displaced by a fixed distance in a direction opposite to the predetermined direction along the slide shaft against an elastic force of the elastic member, the method comprising the step of setting a sensitivity of the acceleration detection device by regulating characteristics of the elastic member and regulating dimension of the mass body with respect to an axial direction of the slide shaft, when dimension of the acceleration detection device with respect to the axial direction of the slide shaft, a mounting position of the fixed contacts on the inner surface of the container, and a position of a portion of the moving contact, which contacts with the fixed contacts, from a tip of the mass body are predetermined.

In such a way, it is possible to obtain a method of setting a sensitivity of an acceleration detection device in which the sensitivity can be set in a wide range.

Furthermore, according to the present invention, there is provided an acceleration detection device comprising: a mass body having a predetermined mass; a moving contact fixed to the mass body and displacing with the mass body; a slide shaft for limiting a displacing direction of the mass body and for slidably supporting the mass body; an elastic member for urging the mass body in a predetermined direction; a container for housing the mass body, the moving contact, the slide shaft and the elastic member; and fixed contacts disposed on an inner surface of the container so as to face with each other and to sandwich the slide shaft, the fixed contacts coming into contact with the moving contact when the mass body is displaced by a fixed distance in an opposite direction to the predetermined direction along the slide shaft against an elastic force of the elastic member, wherein the elastic member has non-linear deflection-load characteristics.

In such a way, it is possible to obtain an acceleration detection device which can be manufactured with a low cost. Furthermore, it is possible to provide an acceleration detection device capable of ensuring a sufficient current carrying time between the fixed contacts even when a large acceleration is generated.

In the acceleration detection device of the present invention, the elastic member may be a compression coil spring formed with an unequal pitch.

In such a way, the elastic member can have non-linear deflection-load characteristics.

In the acceleration detection device of the present invention, the elastic member may be a compression coil spring which is formed to vary a wire radius at a central section.

In such a way, the elastic member can have non-linear deflection-load characteristics.

In the acceleration detection device of the present invention, the elastic member may be a compression coil spring which is formed in a barrel-shape.

In such a way, the elastic member can have non-linear deflection-load characteristics. Further, the total compressed length of the elastic member is reduced and the displacement distance of the mass body from contact of the moving contact with the fixed contacts to collision of the mass body with the inner wall of the container can be lengthened. As a result, even when a large acceleration is generated, the advantageous effect is obtained that the acceleration detection device can ensure a sufficient current carrying time between the fixed contacts. Furthermore, even when the dimension of the device in the direction of the slide shaft is reduced, the displacement distance of the mass body from contact of the moving contact with the fixed contacts to collision of the mass body with the inner wall of the container can be maintained to a certain extent. As a result, even when a large acceleration is generated, the advantageous effect is obtained that the acceleration detection device can be downsized while maintaining a certain level of current carrying time between the fixed contacts.

In the acceleration detection device of the present invention, the elastic member may be a compression coil spring which is formed in a drum-shape.

In such a way, the elastic member can have non-linear deflection-load characteristics. Thus, the total compressed length of the elastic member is reduced and the displacement distance of the mass body from contact of the moving contact with the fixed contacts to collision of the mass body with the stopper is lengthened. As a result, the advantageous effect is obtained that the acceleration detection device can maintain a sufficient current carrying time between the fixed contacts. Further, since the total compressed length is reduced, even when the dimension of the device in the direction of the slide shaft is reduced, the displacement distance of the mass body from contact of the moving contact with the fixed contacts to collision of the mass body with the stopper can be maintained to a certain extent. As a result, the advantageous effect is obtained that it is possible to downsize the device while maintaining a certain level of current carrying time between the fixed contacts.

In the acceleration detection device of the present invention, the elastic member may be a compression coil spring which is formed in a conical shape.

In such a way, the elastic member can have non-linear deflection-load characteristics. Thus, the total compressed length of the elastic member is reduced and the displacement distance of the mass body from contact of the moving contact with the fixed contacts to collision of the mass body with the stopper is lengthened. As a result, the advantageous effect is obtained that it is possible to maintain a sufficient current carrying time between the fixed contacts. Further, since the total compressed length is reduced, even when the dimension of the device in the axial direction of the slide shaft is reduced, the displacement distance of the mass body from contact of the moving contact with the fixed contacts to collision of the mass body with the stopper can be maintained to a certain extent. As a result, the advantageous effect is obtained that the acceleration detection device can be downsized while maintaining a certain level of current carrying time between the fixed contacts.

DETAILED DESCRIPTION OF THE PREFERRED EMBODIMENT

In order to describe the invention in greater detail, the preferred embodiments of the invention will be described below with reference to the accompanying figures.
Embodiment 1

Figure 1:
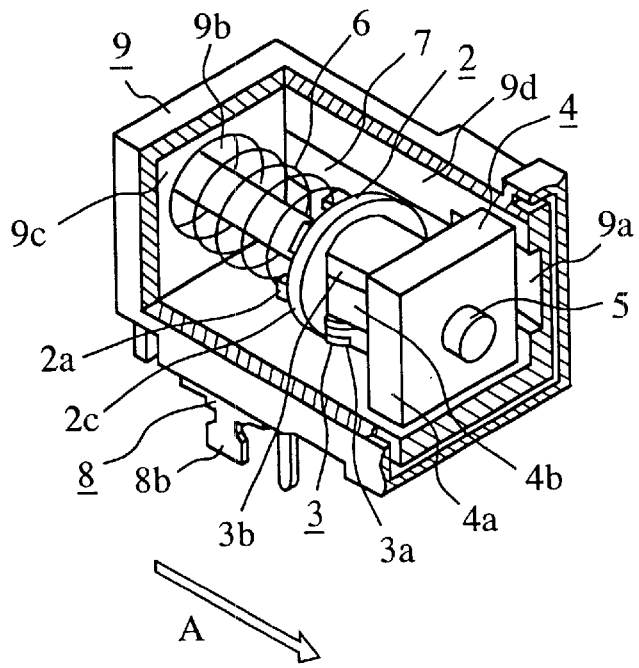
FIG. 1 is a perspective view of a conventional acceleration detection device as disclosed in JP-A-9-211023.
Figure 2:
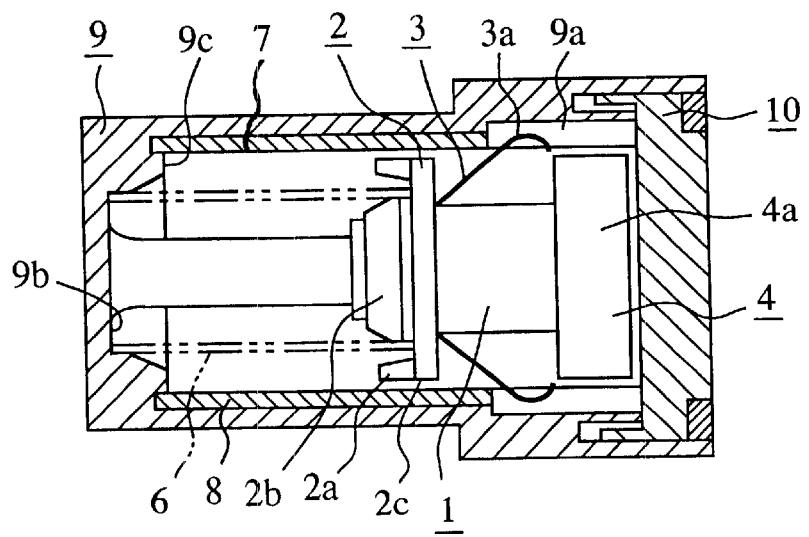
FIG. 2 is a cross sectional view of the acceleration detection device shown in FIG. 1.
Figure 3:
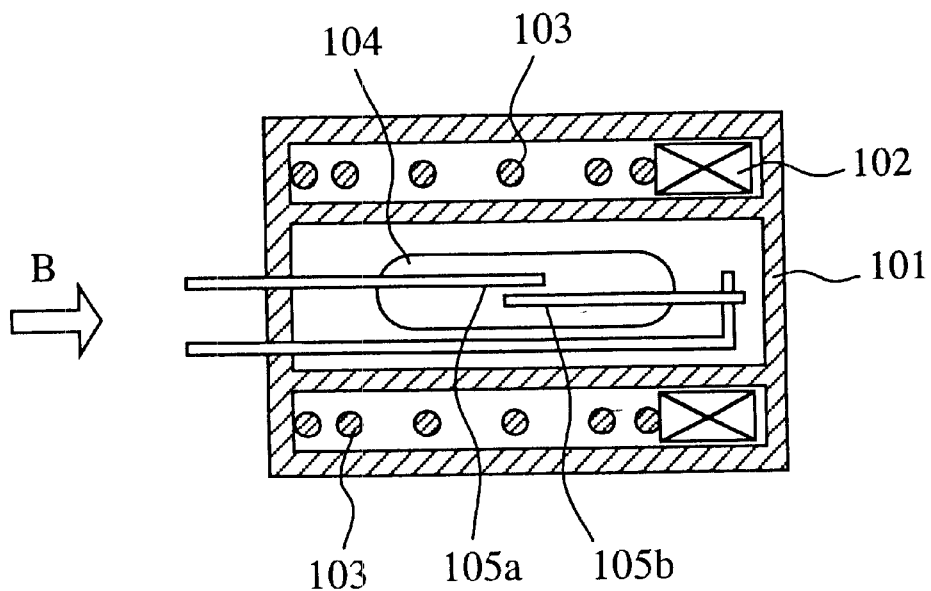
FIG. 3 is a cross sectional view of a conventional lead switch type acceleration detection device as disclosed in JP-A-6-349390.
Figure 4:
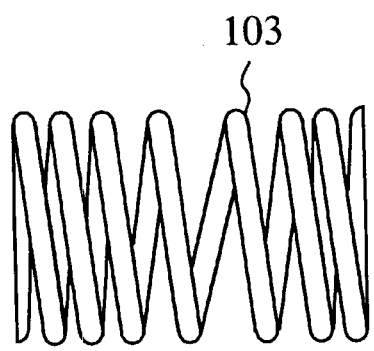
FIG. 4 is a lateral view of a compression coil spring used in the acceleration detection device shown in FIG. 3.
Figure 5A:
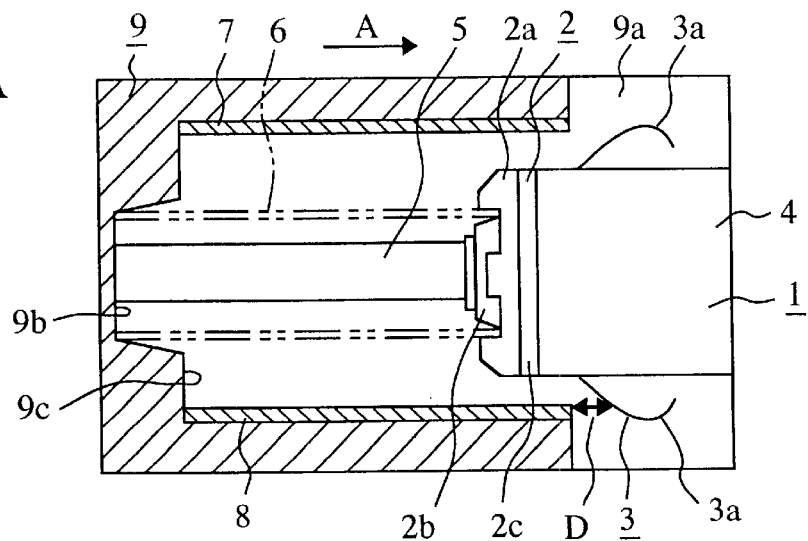
FIGS. 5A–5C are cross sectional views of an acceleration detection device which describes a method of setting a sensitivity of an acceleration detection device according to a first embodiment of the present invention.
Figure 5B:
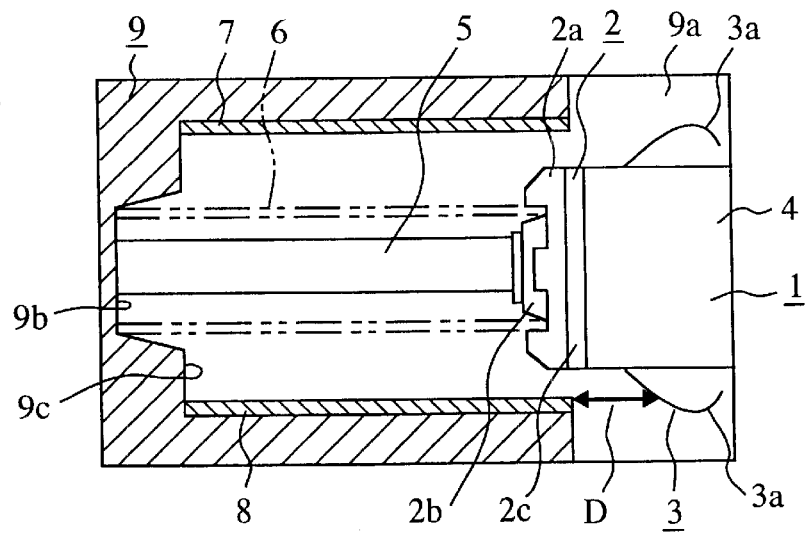
Figure 5C:
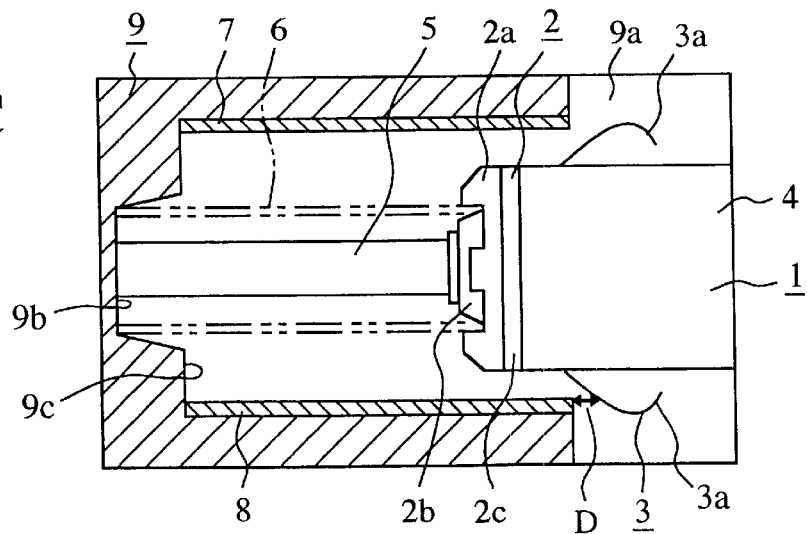

FIG. 5 is a cross sectional view of an acceleration detection device according to a first embodiment of the present invention, which describes a method of setting a sensitivity of the acceleration detection device. FIG. 5(A) shows a mass body with the same dimensions in the direction of the slide shaft as the conventional example. FIG. 5(B) shows a mass body with the smaller dimensions in the direction of the slide shaft as the conventional example. FIG. 5(C) shows a mass body with the larger dimensions in the direction of the slide shaft as the conventional example. The respective figures show the device in an unloaded condition. In the figures, reference numeral 1 denotes a mass body having a predetermined mass and being constituted by a first mass member 2 and a second mass member 4. 3 is a moving contact (switch) which displace with the mass body 1. The moving contact 3 is sandwiched between the first mass member 2 and the second member 4 and is fixed to the mass body 1. The moving contact 3 is provided with two contacts 3a. 5 is a slide shaft which passes through the mass body 1 to limit the moving direction of the mass body 1. The slide shaft 5 slidably supports the mass body 1. 6 is a cylindrical compression coil spring (elastic member) which urges the mass body 1 in a predetermined direction (indicated by arrow A in FIG. 5(A)). 9 is a housing (container) which houses the mass body 1, the moving contact 3, the slide shaft 5 and the compression coil spring 6. 7, 8 are fixed contacts (switches) which are arranged on an inner face of the housing 9 so as to be faced with each other and to sandwich the slide shaft 5. The fixed contacts 7, 8 come into contact with the moving contact 3 when the mass body 1 is displaced by a fixed distance in an opposite direction to the above predetermined direction along the slide shaft 5 against the elastic force of the compression coil spring 6. One end of the compression coil spring 6 abuts with the mass body 1 and the other end abuts with the housing 9.

The tip portion of the contact 3a of the moving contact 3 is formed in the shape of a letter R. The respective contacts 3a are formed in a straight cantilever with respect to the mass body 1.

The housing 9 is provided with a notch 9a for housing the contacts 3a of the moving contact 3 when not in contact with the fixed contacts 7, 8, a coil spring fixing portion 9b for fixing an end of the compression coil spring 6, and a stopper 9c for limiting the displacement of the mass body 1.

The first mass member 2 is provided with a shock absorbing member 2a which absorbs the shock upon collision with the stopper 9c of the housing 9, a tapered portion 2b which guides the compression coil spring 6 when the first mass member is coupled with the compression coil spring 6 and which acts as a seat surface when coupled, and a base 2c on which the shock absorbing member 2a and the tapered portion 2b are mounted. The shock absorbing member 2a is of a rubber-like material having a large shock absorbing capacity, for example, a thermoplastic elastomer. The shock absorbing member 2a is fixed to the base 2c by burning onto the base 2c.

In this type of acceleration detection device, the sensitivity which corresponds to a threshold value of a detectable acceleration is determined based on a spring constant of the compression coil spring 6, an initial load which is a load applied to the compression coil spring 6 by the mass body 1 in an unloaded condition in which acceleration is not generated, the distance between the moving contact 3 and the fixed contacts 7, 8 in the unloaded condition, and the mass of the mass body 1.

As shown in FIG. 5(B), when the dimension of the mass body 1 with respect to an axial direction of the slide shaft 5 is reduced, the mass of the mass body 1 is reduced. As a result, when the initial load and the spring constant of the compression coil spring 6 are fixed and when the dimension of the mass body 1 with respect to the axial direction of the slide shaft 5 is reduced, displacement of the mass body 1 is suppressed and sensitivity is reduced. Furthermore, when the dimension of the acceleration detection device in the axial direction of the slide shaft 5, the mounting position of the fixed contacts 7, 8 on the inner surface of the housing 9 and the position of the contact 3a of the moving contact 3 from the tip of the mass body 1 are determined in advance, the distance between the moving contact 3 and the fixed contacts 7, 8 in an unloaded condition is increased with reduction in the dimension of the mass body 1 in the axial direction of the slide shaft 5. As a result, when the initial load and the spring constant of the compression coil spring 6 are fixed and when the dimension of the acceleration detection device in the axial direction of the slide shaft 5, the mounting position of the fixed contacts 7, 8 on the inner surface of the housing 9 and the position of the contact 3a of the moving contact 3 from the tip of the mass body 1 are pre-determined, the displacing distance of the mass body 1 necessary for bringing the contact 3a of the moving contact 3 into contact with the fixed contacts 7, 8 is increased with reduction in the dimension of the mass body 1 in the direction of the slide shaft 5, and thus sensitivity is further reduced.

As shown in FIG. 5(C), when the dimension of the mass body 1 with respect to the axial direction of the slide shaft 5 is increased, the mass of the mass body 1 is also increased. As a result, when the initial load and the spring constant of the compression coil spring 6 are fixed, displacement of the mass body 1 is facilitated with increment in the dimension of the mass body 1 with respect to the axial direction of the slide shaft 5. Thus, the sensitivity is increased. Furthermore, when the dimension of the acceleration detection device in the direction of the slide shaft 5, the mounting position of the fixed contacts 7, 8 with respect to the inner surface of the housing 9 and the position of the contact 3a of the moving contact 3 from the tip of the mass body 1 are pre-determined, the distance D between the moving contact 3 and the fixed contacts 7, 8 in an unloaded condition is reduced together with increment in the dimension of the mass body 1 with respect to the direction of the slide shaft 5. As a result, when the initial load and the spring constant of the compression coil spring 6 are fixed and when the dimension of the acceleration detection device in the direction of the slide shaft 5, the mounting position of the fixed contacts 7, 8 on the inner surface of the housing 9 and the position of the contact 3a of the moving contact 3 from the tip of the mass body 1 are pre-determined, the distance of displacement of the mass body 1 necessary for bringing the contact 3a of the moving contact 3 into contact with the fixed contacts 7, 8 is reduced with increment in the dimension of the mass body 1 in the direction of the slide shaft 5, and thus the sensitivity is further increased.

The operation of the acceleration detection device when provided in a moving body such as an automobile will be described below.

In an unloaded condition that a moving body such as an automobile is running normally, the mass body 1 is urged in a direction A by the elastic force of the compression coil spring 6. As a result, the contact 3a of the moving contact 3 is separated from the fixed contacts 7, 8, namely, the contact 3a of the moving contact 3 does not make a contact with the fixed contacts 7, 8. Thus, an electrical connection does not exist between the fixed contacts 7, 8 and the moving contact 3. Therefore, the fixed contacts 7, 8 are not electrically connected to each other and an electric current does not flow between them. This displays the fact that the moving body such as an automobile is traveling normally and has not undergone a collision.

When the moving body such as an automobile experiences a collision and an acceleration (deceleration) is generated as a result, the mass body 1 slidably supported is displaced towards the stopper 9c against the elastic force of the compression coil spring 6. At this time, the contact 3a of the moving contact 3 contacts with the fixed contacts 7, 8 and slides in such a state. As a result, a continuous electrical connection is kept between the fixed contacts 7, 8 and the moving contact 3. Thus, when the moving body such as an automobile experiences a collision and an acceleration is generated as a result, the fixed contacts 7, 8 are electrically connected to each other and a current flows between them. This displays the fact that the moving body such as an automobile has undergone a collision.

As shown above, according to the first embodiment of the present invention, the setting of the sensitivity of the acceleration detection device is performed by regulating the characteristics of the compression coil spring 6 such as an initial load or a spring constant of the compression coil spring 6 and regulating the dimension of the mass body 1 in the direction of the slide shaft 5. Thus, the advantageous effect is obtained that the sensitivity can be set within a wide range.

Furthermore, according to the first embodiment, when the dimension of the acceleration detection device with respect to the direction of the slide shaft 5, the mounting position of the fixed contacts 7, 8 on the inner surface of the housing 9 and the position of the contact 3a of the moving contact 3 from the tip of the mass body 1 are pre-determined, the setting of the sensitivity of the acceleration detection device is performed by regulating the characteristics of the compression coil spring 6 such as an initial load or a spring constant of the compression coil spring 6 and regulating the dimension of the mass body 1 in the direction of the slide shaft 5. Thus, the advantageous effect is obtained that the sensitivity can be set within a wide range.

Embodiment 2

Figure 6:
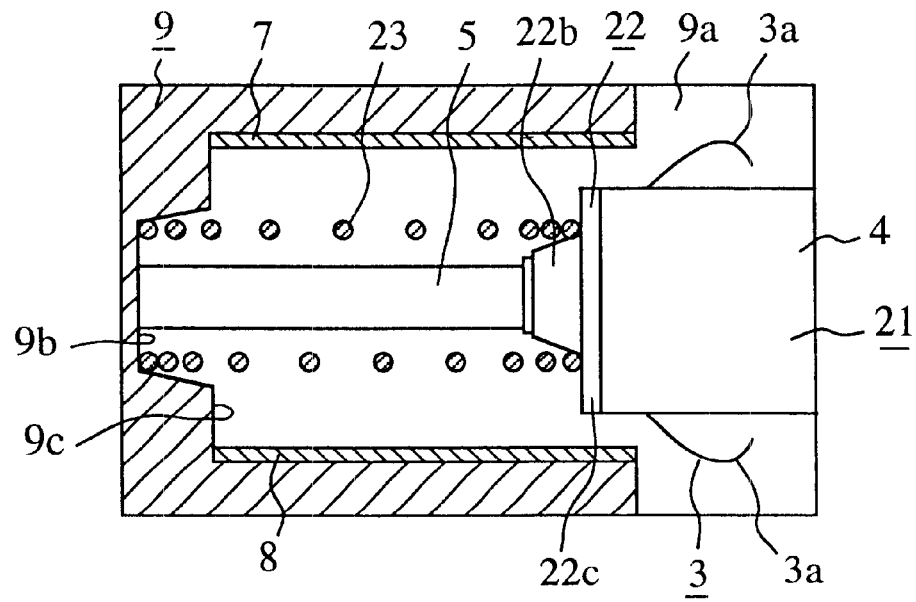
FIG. 6 is a cross sectional view of an acceleration detection device according to a second embodiment of the present invention.
Figure 7:
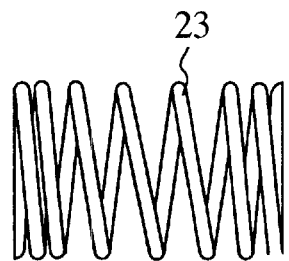
FIG. 7 is a lateral view of a compression coil spring used in the acceleration detection device shown in FIG. 6.
Figure 8:
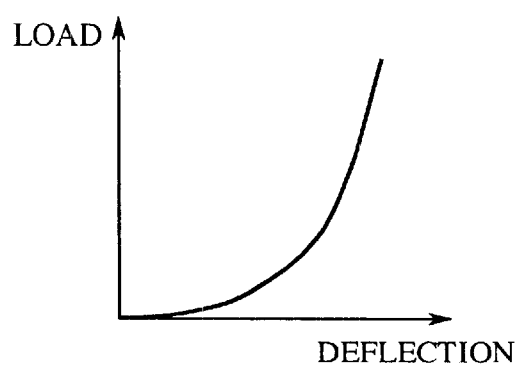
FIG. 8 shows the load-deflection characteristics of the compression coil spring shown in FIG. 7.

FIG. 6 is a lateral cross section of an acceleration detection device according to a second embodiment of the present invention. FIG. 7 is a lateral view of a compression coil spring used in the acceleration detection device as shown in FIG. 6. FIG. 8 shows the deflection-load characteristics of the compression coil spring as shown in FIG. 7. In the figures, reference numeral 21 denotes a mass body having a predetermined mass. The mass body 21 is constituted by a first mass member 22 and a second mass member 4. 23 is a compression coil spring (elastic member) which is formed with an unequal pitch. Other components are the same as or equivalent to those described in FIG. 5, and therefore, additional description will be omitted.

The second mass member 22 is provided with a tapered portion 22b for guiding the compression coil spring 23 when joined with the compression coil spring 22 and acting as a seat surface when joined, and a base 22c on which the tapered portion 2b is mounted. However, the shock absorbing member as provided in the conventional acceleration detection device is not provided. Also, the collision buffer as provided in the conventional acceleration detection device is not provided.

The compression coil spring formed with an unequal pitch has a large spring constant at a section with a wide pitch and a low spring constant at a section with a narrow pitch. Thus, the compression coil spring formed with the unequal pitch has non-linear deflection-load characteristics as shown in FIG. 8.

Next, the operation of the acceleration detection device when provided in a moving body such as an automobile will be described below.

When the moving body such as an automobile experiences a strong collision and a large acceleration is generated as a result, the mass body 21 displaces up to the position of the stopper 9c against the elastic force of the compression coil spring 23. At this time, since the compression coil spring 23 has the non-linear deflection-load characteristics, the elastic force of the compression coil spring 23 is increased near the stopper 9c and the speed at which the mass body 21 collides with the stopper 9c is reduced. Thus, when the mass body 21 collides with the stopper 9c, the generated energy is lower than that in the conventional acceleration detection device. Therefore, it is not necessary to provide a shock absorbing member or a collision absorbing member as provided in the conventional acceleration detection device. Further, since the speed at which the mass body 21 collides with the stopper 9c is reduced, the current flowing time between the fixed contacts 7, 8 until the mass body 21 collides with the stopper 9c is lengthened.

As shown above, according to the second embodiment, since a compression coil spring 23 which is formed with an unequal pitch and has non-linear deflection-load characteristics is used, the speed at which the mass body 21 collides with the stopper 9c is reduced. Thus, it is not necessary to provide a shock absorbing member or a collision buffer as provided in the conventional acceleration detection device. Therefore, the manufacturing cost can be reduced.

Furthermore, according to the second embodiment, since a compression coil spring 23 is used which is formed with an unequal pitch and has non-linear deflection-load characteristics, the speed at which the mass body 21 collides with the stopper 9c is reduced. Therefore, even when a large acceleration is generated, it is possible to secure a sufficient current carrying time between the fixed contacts 7, 8.

Embodiment 3

Instead of the compression coil spring 23 formed with an unequal pitch in the second embodiment, a compression coil spring which is formed to vary a wire radius at a central position is used in a third embodiment of the present invention.

Figure 9:
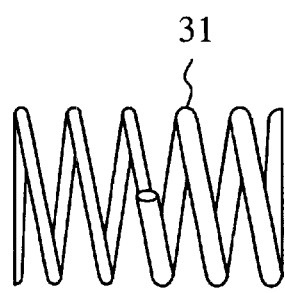
FIG. 9 is a lateral view of a compression coil spring used in an acceleration detection device according to a third embodiment of the present invention.

FIG. 9 is a lateral view of a compression coil spring used in an acceleration detection device according to the third embodiment of the present invention. In the figure, reference numeral 31 denotes a compression coil spring (elastic member) which is formed to vary a wire radius at a central portion.

The compression coil spring 31 which is formed to vary a wire radius at a central portion has a large spring constant at a section at which a wire radius is large and a small spring constant at a section at which a wire radius is small. Thus, the compression coil spring 31 which is formed to vary a wire radius at a central position also has non-linear deflection-load characteristics as shown in FIG. 8.

As shown above, according to the third embodiment, since a compression coil spring 31 which is formed to vary a wire radius at a central portion and has the non-linear deflection-load characteristics is used, an advantageous effect equivalent to the second embodiment can be obtained.

Embodiment 4

Instead of the compression coil spring 23 formed with an unequal pitch in the second embodiment, a compression coil spring formed in a barrel-shape is used in a fourth embodiment of the present invention.

Figure 10:
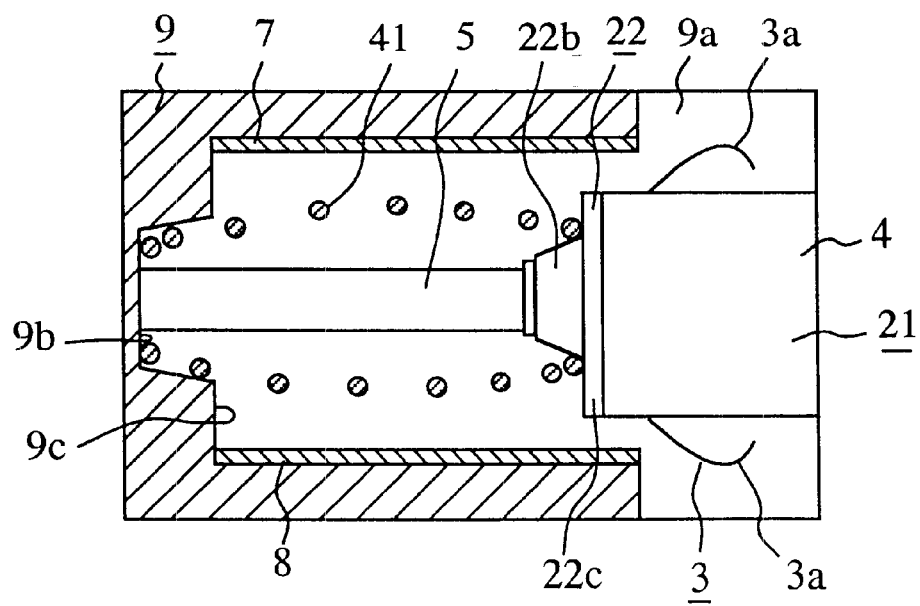
FIG. 10 is a cross sectional view of an acceleration detection device according to a fourth embodiment of the present invention.
Figure 11:
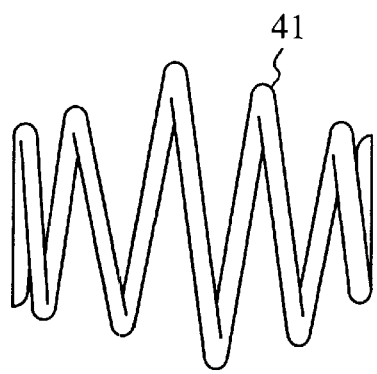
FIG. 11 is a lateral view of a compression coil spring used in the acceleration detection device shown in FIG. 10.

FIG. 10 is a cross sectional view of an acceleration detection device according to a fourth embodiment of the present invention. FIG. 11 is a lateral view of a compression coil spring used in the acceleration detection device as shown in FIG. 10. In the figures, reference numeral 41 denotes a compression coil spring (elastic member) which is formed in a barrel-shape. Other components are the same as or equivalent to those shown in FIG. 5, and therefore, additional description will be omitted.

The compression coil spring 41 which is formed in a barrel-shape has a small spring constant at a section at which a coil radius is large and a large spring constant at a section at which a coil radius is small. Therefore, the compression coil spring 41 formed in the barrel-shape also has the non-linear deflection-load characteristics as shown in FIG. 8.

Further, the compression coil spring 41 formed in the barrel-shape has a small total compressed length. Even when the wire radius is increased, the total compressed length of the compression coil spring 41 is small.

As shown above, according to the fourth embodiment, since a compression coil spring 41 which is formed in a barrel-shape and which has the non-linear deflection-load characteristics is used, an equivalent advantageous effect to the second embodiment can be obtained.

Further, according to the fourth embodiment, since a compression coil spring 41 which is formed in a barrel-shape and which has a small total compression length is used, the distance of displacement of the mass body 1 from the connection between the moving contact 3 and the fixed contacts 7, 8 to the collision with the stopper 9c is lengthened. Thus, even when a large acceleration is generated, it is possible to ensure a sufficient current carrying time between the fixed contacts 7, 8.

Furthermore, according to the fourth embodiment, since a compression coil spring 41 which is formed in a barrel-shape and which has a small total compression length is used, even when the dimension of the device with respect to the direction of the slide shaft 5 is reduced, the distance of displacement of the mass body 1 from the connection between the moving contact 3 and the fixed contacts 7, 8 to the collision with the stopper 9c is ensured to a certain extent. Thus, even when a large acceleration is generated, it is possible to downsize the device while ensuring a current carrying time between the fixed contacts 7, 8 to a certain extent.

Embodiment 5

Instead of the compression coil spring 23 formed with an unequal pitch as in the second embodiment, a compression coil spring formed in a drum-shape is used in a fifth embodiment of the present invention.

Figure 12:
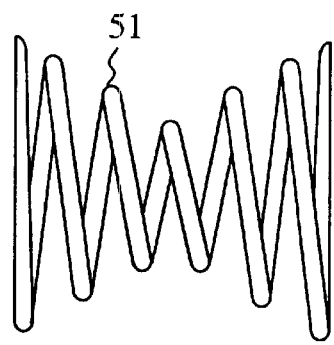
FIG. 12 is a lateral view of a compression coil spring used in an acceleration detection device according to a fifth embodiment of the present invention.

FIG. 12 is a lateral view of a compression coil spring used in an acceleration detection device according to the fifth embodiment of the present invention. In the figure, reference numeral 51 denotes a compression coil spring (elastic member) which is formed in a drum-shape.

The compression coil spring 51 formed in the drum-shape, as well as the compression coil spring 41 formed in a barrel-shape as shown in FIG. 11, has a small spring constant at a section at which a coil radius is large and a large spring constant at a section at which a coil radius is small. Thus, the compression coil spring 51 formed in a drum-shape also has the non-linear deflection-load characteristics as shown in FIG. 8.

Further, the compression coil spring 51 formed in a drum-shape has a small total compression length. Even when the wire radius is increased, the total compression length of the compression coil spring 51 is small.

As shown above, according to the fifth embodiment, since a compression coil spring 51 which is formed in a drum-shape and has nonlinear deflection-load characteristics is used, an equivalent advantageous effect to the second embodiment can be obtained.

Furthermore, according to the fifth embodiment, since a compression coil spring 51 which is formed in a drum-shape and which has a small total compression length is used, an equivalent advantageous effect to the fourth embodiment can be obtained.

Embodiment 6

Instead of the compression coil spring 23 formed with an unequal pitch in the second embodiment, a compression coil spring formed in a conical-shape is used in a sixth embodiment of the present invention.

Figure 13:
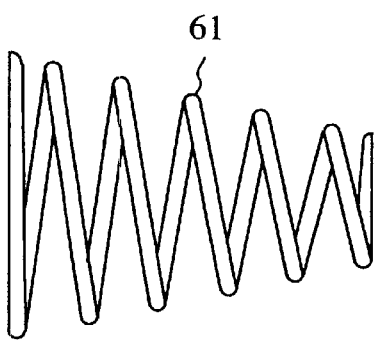
FIG. 13 is a lateral view of a compression coil spring used in an acceleration detection device according to a sixth embodiment of the present invention.

FIG. 13 is a lateral view of a compression coil spring used in an acceleration detection device according to the sixth embodiment of the present invention. In the figure, reference numeral 61 denotes a compression coil spring (elastic member) which is formed in a conical-shape.

The compression coil spring 61 formed in a conical-shape, as well as the compression coil spring 41 formed in a barrel-shape as shown in FIG. 11, has a small spring constant at a section at which a coil radius is large and a large spring constant at a section at which a coil radius is small. Thus, the compression coil spring 61 formed in a conical-shape also has the non-linear deflection-load characteristics as shown in FIG. 8.

Further, the compression coil spring 61 formed in a conical-shape has a small total compression length. Even when the wire radius is increased, the total compression length of the compression coil spring 61 is small.

As shown above, according to the sixth embodiment, since a compression coil spring 61 which is formed in a conical-shape and which has the non-linear deflection-load characteristics is used, an equivalent advantageous effect to the second embodiment can be obtained.

Furthermore, according to the sixth embodiment, since a compression coil spring 61 which is formed in a conical-shape and which has a small total compression length is used, an equivalent advantageous effect to the fourth embodiment can be obtained.

As shown above, an acceleration detection device according to the present invention is adapted to reduce the manufacturing cost, to ensure the sufficient current carrying time, and to downsize the device.

Furthermore, a method of setting a sensitivity of the acceleration detection device according to the present invention is adapted to set the sensitivity in a wide range.

What is claimed is:

1. A method of setting a sensitivity for an acceleration detection device, said acceleration detection device including a mass body having a predetermined mass, a shaft for limiting a direction of displacement of said mass body, an elastic member for urging said mass body in a predetermined direction, and a switch which is turned on when said mass body is displaced by a fixed distance in an opposite direction to said predetermined direction along said shaft against an elastic force of said elastic member, said method comprising the step of:

setting a sensitivity of the acceleration detection device by appropriately selecting characteristics of said elastic member in coordination with a length of said mass body with respect to an axial direction of the shaft.

2. A method of setting a sensitivity for an acceleration detection device, said acceleration detection device including a mass body having a predetermined mass, a moving contact fixed to said mass body and displaced with said mass body, a slide shaft for limiting a direction of displacement of said mass body and for slidably supporting said mass body, an elastic member for urging said mass body in a predetermined direction, a container for housing said mass body, said moving contact, said slide shaft and said elastic member, and a plurality of fixed contacts disposed on an inner surface of said container to face with each other and to sandwich said slide shaft, said fixed contacts contacting with said moving contact when said mass body is displaced by a fixed distance in a direction opposite to said predetermined direction along said slide shaft against an elastic force of said elastic member, said method comprising the step of:

setting a sensitivity of the acceleration detection device by appropriately selecting characteristics of said elastic member in coordination with a length of said mass body with respect to an axial direction of the slide shaft, when dimension of said acceleration detection device with respect to the axial direction of said slide shaft, a mounting position of said fixed contacts on the inner surface of said container, and a position of a portion of said moving contact, which contacts with said fixed contacts, from a tip of the mass body are predetermined.

3. An acceleration detection device comprising:

a mass body having a predetermined mass;

a moving contact fixed to said mass body and displacing with said mass body;

a slide shaft for limiting a displacing direction of said mass body and for slidably supporting said mass body;

an elastic member for urging said mass body in a predetermined direction;

a container for housing said mass body, said moving contact, said slide shaft and said elastic member; and fixed contacts disposed on an inner surface of said container so as to face with each other and to sandwich said slide shaft, said fixed contacts coming into contact with said moving contact when said mass body is displaced by a fixed distance in an opposite direction to said predetermined direction along said slide shaft against an elastic force of said elastic member, wherein said elastic member has non-linear deflection-load characteristics.

4. The acceleration detection device according to claim 3, wherein said elastic member is a compression coil spring formed with an unequal pitch.

5. The acceleration detection device according to claim 3, wherein said elastic member is a compression coil spring which is formed to vary a wire radius at a central portion.

6. The acceleration detection device according to claim 3, wherein said elastic member is a compression coil spring which is formed in a barrel-shape.

7. The acceleration detection device according to claim 3, wherein said elastic member is a compression coil spring which is formed in a drum-shape.

8. The acceleration detection device according to claim 3, wherein said elastic member is a compression coil spring which is formed in a conical shape.

* * * * *